Jan. 12, 1926.

F. W. PARSONS

COMPRESSOR VALVE LIFTER

Filed Jan. 22, 1925

1,569,671

INVENTOR
Frederick W. Parsons
BY
HIS ATTORNEY

Patented Jan. 12, 1926.

1,569,671

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

COMPRESSOR-VALVE LIFTER.

Application filed January 22, 1925. Serial No. 4,058.

*To all whom it may concern:*

Be it known that I, FREDERICK W. PARSONS, a citizen of the United States, and a resident of Elmira, county of Chemung, State of New York, have invented a certain Compressor-Valve Lifter, of which the following is a specification, accompanied by drawings.

This invention relates to compressors, but more particularly to a mechanism for automatically holding open the inlet valve or valves of a compressor when the compressed fluid within a storage receiver attains a certain predetermined pressure.

The objects of this invention are to improve upon valve lifters of this type, increase the certainty of operation, render the mechanism more positive in action, reduce the chance of leakage of pressure fluid, and secure a stronger and more rugged construction better able to withstand the strains and wear of constant usage.

Other objects will be in part obvious and will be in part pointed out in the following specifications and description of the accompanying drawings.

Figure 1:
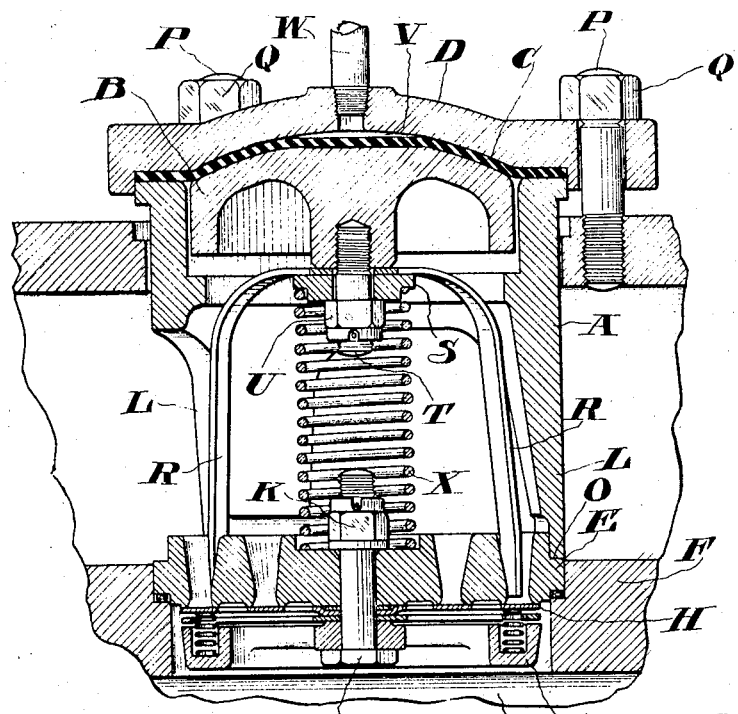
Figure 2:
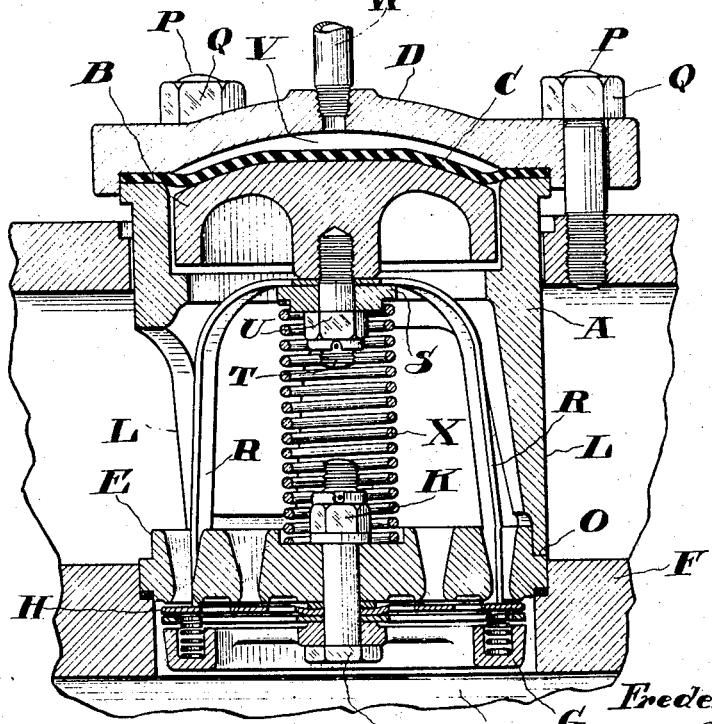

Figure 1 is a vertical sectional elevation of a compressor valve lifter showing the position of the parts when compressed fluid passes to the receiver, and Figure 2 is a vertical sectional elevation of a compressor valve lifter showing the inlet valve unseated.

Referring to the drawings, a cylindrical cage A has a recess in its outer end, and a cylindrical guide B is arranged to reciprocate within the recess. Disposed on the outer end of the cage A is a circular flexible diaphragm C which is held in position and securely clamped at its outer edge by means of a cover plate D.

A valve mechanism, shown as an inlet valve, comprises in this instance a valve seat E arranged within a cylinder wall F and a guard plate G. A plate valve H is clamped between the valve seat E and the guard plate G by a bolt J provided with a nut K. The cage A has a plurality of legs L which rest upon a shoulder O of the valve seat E, and serve to hold said valve seat firmly within the wall F when the cover plate D is clamped upon the outer edge of the cage A. The cover plate D is preferably secured by means of stud bolts P provided with suitable nuts Q. A plurality of legs R are secured to the under side of the guide B, and extend to a point near the plate valve H when the guide B is in normal retracted position. The legs R are preferably clamped between the guide B and a spring seat S by means of a stud bolt T and a nut U. A pressure chamber V, formed by the diaphragm C and the cover plate D, is at all times in communication with a storage receiver (not shown) through a pipe W which is secured to the cover plate D by means of screw threads.

The guide B and the diaphragm C are held in a normally retracted or outward position against the cover plate D, by a spring X, in this instance, disposed between the guide B and the valve seat E. The compressing element comprises a compressing chamber Y containing a suitable piston (not shown).

In operation, air is drawn into the chamber Y on the suction stroke of the piston, and on the compression stroke of the piston the air is discharged through suitable discharge valves (not shown) into the storage receiver. After the desired pressure has been attained in the storage receiver, and consequently in the pressure chamber V, the fluid pressure on the diaphragm C will force the guide B inwardly and the force of the spring X will be overcome, and the ends of the fingers R will bear against the valve H, thus unseating said valve. The valve will be held open until the pressure within the receiver is sufficiently reduced to permit the spring X to raise the fingers R, whereupon the valve H will return to its seat and the air compressed in the compressing chamber Y will be discharged into the storage receiver.

I claim:

1. Means for actuating a plate valve lifter for compressors of the type in which fingers extending outwardly and downwardly bear upon the valve, comprising a cylindrical cage adapted to fit in the cylinder jacket and to fit over and bear upon the valve assembly, a cover plate adapted to be bolted upon the cylinder jacket and to bear upon and hold the said cage in position, a recess in the upper part of said cage, a cylindrical piston adapted to fit loosely in said recess, a flexible diaphragm held clamped between the side walls of the said cage and the said cover plate over and in contact with said piston, a valve lifter of the type described operably mounted in the lower part of said cage, and connecting means between the said valve lifter and the said cylindrical piston, the assembly being such that the expansion of the said diaphragm will force the said piston downwardly and will actuate the valve lifter.

2. Means for actuating a plate valve for compressors of the type in which fingers extending outwardly and downwardly bear upon the valve, comprising a cylindrical cage adapted to fit over and upon the seat of a plate valve, a cover plate adapted to be bolted to the cylinder jacket and to hold the said cage in fixed relation to the said plate valve, a diaphragm held between said cylindrical cage and the cover plate and actuated by pressure fluid entering through the said cover, a piston fitting loosely on the upper part of said cage and responsive to said diaphragm, a valve lifter of the type described operably mounted in the lower part of said cage and means for suitably connecting the said valve lifter to the said piston.

In testimony whereof I have signed this specification.

FREDERICK W. PARSONS.